US010890449B2

(12) United States Patent
Prasad

(10) Patent No.: US 10,890,449 B2
(45) Date of Patent: Jan. 12, 2021

(54) NAVIGATION SYSTEM

(71) Applicant: APTIV TECHNOLOGIES LIMITED, St. Michael (BB)

(72) Inventor: Premchand Krishna Prasad, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 443 days.

(21) Appl. No.: 15/906,139

(22) Filed: Feb. 27, 2018

(65) Prior Publication Data

US 2019/0265042 A1    Aug. 29, 2019

Related U.S. Application Data

(60) Provisional application No. 62/635,119, filed on Feb. 26, 2018.

(51) Int. Cl.
| | | |
|---|---|---|
| *G01C 21/10* | (2006.01) |
| *G01C 21/20* | (2006.01) |
| *B60W 10/18* | (2012.01) |
| *B60W 10/20* | (2006.01) |
| *B60W 30/10* | (2006.01) |

(Continued)

(52) U.S. Cl.
CPC ............ *G01C 21/20* (2013.01); *B60W 10/18* (2013.01); *B60W 10/20* (2013.01); *B60W 30/10* (2013.01); *G01C 21/32* (2013.01); *G01C 21/3658* (2013.01); *G01C 21/3667* (2013.01); *B60W 2710/18* (2013.01); *B60W 2710/20* (2013.01)

(58) Field of Classification Search
None
See application file for complete search history.

(56) References Cited

U.S. PATENT DOCUMENTS

| | | | | |
|---|---|---|---|---|
| 2005/0060069 A1* | 3/2005 | Breed | .................. | B60N 2/2863 |
| | | | | 701/408 |
| 2005/0137786 A1* | 6/2005 | Breed | .................. | G05D 1/0246 |
| | | | | 701/482 |

(Continued)

OTHER PUBLICATIONS

"Extended European Search Report", EP Application No. 19158564. 5, Aug. 6, 2019, 10 pages.

*Primary Examiner* — Richard M Camby
(74) *Attorney, Agent, or Firm* — Colby Nipper PLLC

(57) ABSTRACT

A navigation system includes a digital-map, a global-positioning-system receiver, and one or more controller-circuits. The digital-map includes a record of global-positioning-system dead-zones. The global-positioning-system receiver indicates a position of a host-vehicle on the digital-map. The one or more controller-circuits are in communication with the global-positioning-system receiver and the digital-map. The one or more controller-circuits are configured to steer the host-vehicle. The one or more controller-circuits determine the position of the host-vehicle relative to the global-positioning-system dead-zone and determining whether a travel-path for the host-vehicle includes a lane-change to a desired-lane. In accordance with the determination by the one or more controller-circuits that the travel-path includes a lane-change and that the host-vehicle is outside of the global-positioning-system dead-zone, the one or more controller-circuits steer the host-vehicle to the desired-lane.

20 Claims, 6 Drawing Sheets

(51) Int. Cl.
  *G01C 21/36* (2006.01)
  *G01C 21/32* (2006.01)

(56) References Cited

U.S. PATENT DOCUMENTS

| | | | |
|---|---|---|---|
| 2007/0021915 A1* | 1/2007 | Breed | G08G 1/164 |
| | | | 701/301 |
| 2010/0082195 A1 | 4/2010 | Lee et al. | |
| 2011/0307171 A1 | 12/2011 | Waite | |
| 2017/0103571 A1* | 4/2017 | Beaurepaire | G09B 9/02 |

* cited by examiner

NAVIGATION SYSTEM

TECHNICAL FIELD OF INVENTION

This disclosure generally relates to a navigation system, and more particularly relates to a navigation system that recognizes a global-positioning-system dead-zone.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
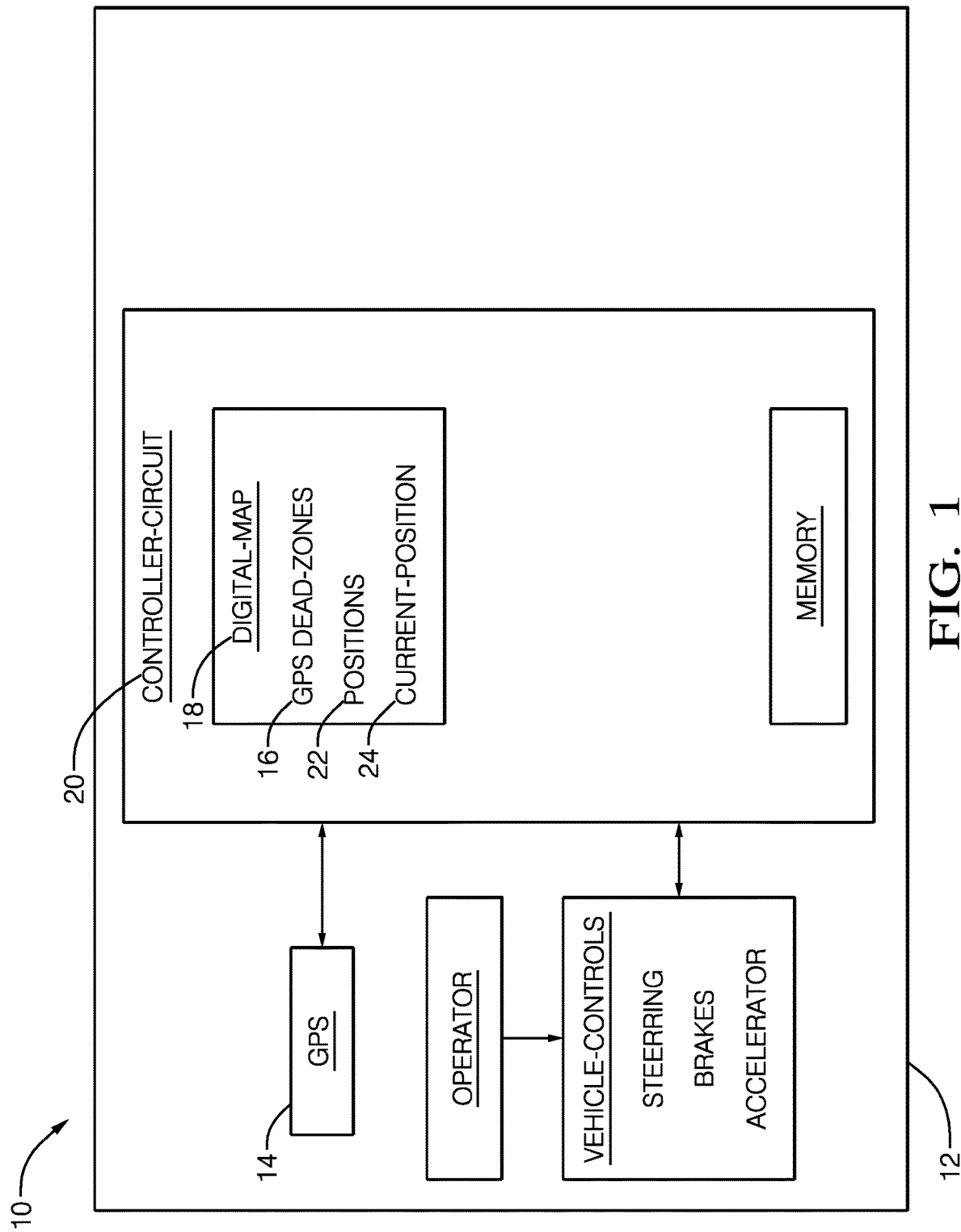
FIG. 1 is an illustration of a navigation system in accordance with one embodiment.

FIG. 1 illustrates an example of a navigation system 10, hereafter referred to as the system 10, installed on a host-vehicle 12. As will be described in more detail below, the system 10 is an improvement over prior navigation systems because the system 10 identifies global-positioning-system dead-zones 16 (GPS-dead-zones 16) and updates a digital-map 18 with locations of the GPS-dead-zones 16. The GPS-dead-zones 16 may be caused by tunnels, overpasses, or a "canyon effect" of buildings. The updated digital-map 18 is beneficial for path-planning and enables the system 10 to identify a future change of travel-lanes to be executed outside of the GPS-dead-zone 16. Path-planning used in autonomous vehicles, or used in vehicles with advanced driver assistance systems (ADAS), requires extremely accurate localization information, which is based, at least in part, on accurate global positioning system information. Knowing that a GPS-dead-zone 16 is approaching and knowing that the localization information will likely be degraded in the GPS-dead-zone 16, deciding to make a driving maneuver while the localization information is accurate is beneficial because it improves the safety of the host-vehicle 12.

The system 10 includes the host-vehicle 12, a controller-circuit 20, a global-positioning-system receiver 14 (GPS 14), and the digital-map 18. In the example illustrated in FIG. 1, the GPS 14 is mechanically coupled to the host-vehicle 12. The GPS 14 may be any of the known GPS 14 used in automotive applications.

The digital-map 18 includes at least one record of one or more positions 22 where global-positioning-system signals are unavailable (i.e., undetectable, too weak to detect, and/or where the number of available satellite signals is insufficient to produce an accurate position). The digital-map 18 is located on-board the host-vehicle 12 and is integrated into the controller-circuit 20, as illustrated in FIG. 1. In another embodiment, the digital-map 18 is stored 'in the cloud' and accessed via a transceiver (e.g. Wi-Fi, cellular, satellite—not shown). In another embodiment, the digital-map 18 and transceiver are also part of the GPS 14. The controller-circuit 20 may also include an internet-transceiver (not shown) that updates the digital-map 18 with GPS-dead-zone 16 position 22 information. The internet-transceiver may be any internet-transceiver suitable for automotive applications and may include Wi-Fi, cellular, and satellite devices (not shown).

The controller-circuit 20 is in communication with the host-vehicle 12, the GPS 14 and the digital-map 18. The controller-circuit 20 may include a processor (not shown) such as a microprocessor or other control circuitry such as analog and/or digital control circuitry including an application specific integrated circuit (ASIC) for processing data as should be evident to those in the art. The controller-circuit 20 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the GPS-dead-zone 16 exists based on signals received by the controller-circuit 20 from the GPS 14 and the digital-map 18, as described herein.

The controller-circuit 20 determines whether a current-position 24 of the host-vehicle 12 corresponds to the position 22 where global-positioning-system signals are unavailable based on signals received from the GPS 14 and signals received from the digital-map 18. In accordance with the determination that the current-position 24 of the host-vehicle 12 corresponds to the position 22 where global-positioning-system signals are unavailable, the controller-circuit 20 updates the one or more positions 22 of the digital-map 18 to include the current-position 24. That is, the controller-circuit 20 updates the digital-map 18 with the newly determined positions 22 of the GPS-dead-zones 16 at the current-position 24 of the host-vehicle 12.

Figure 2:
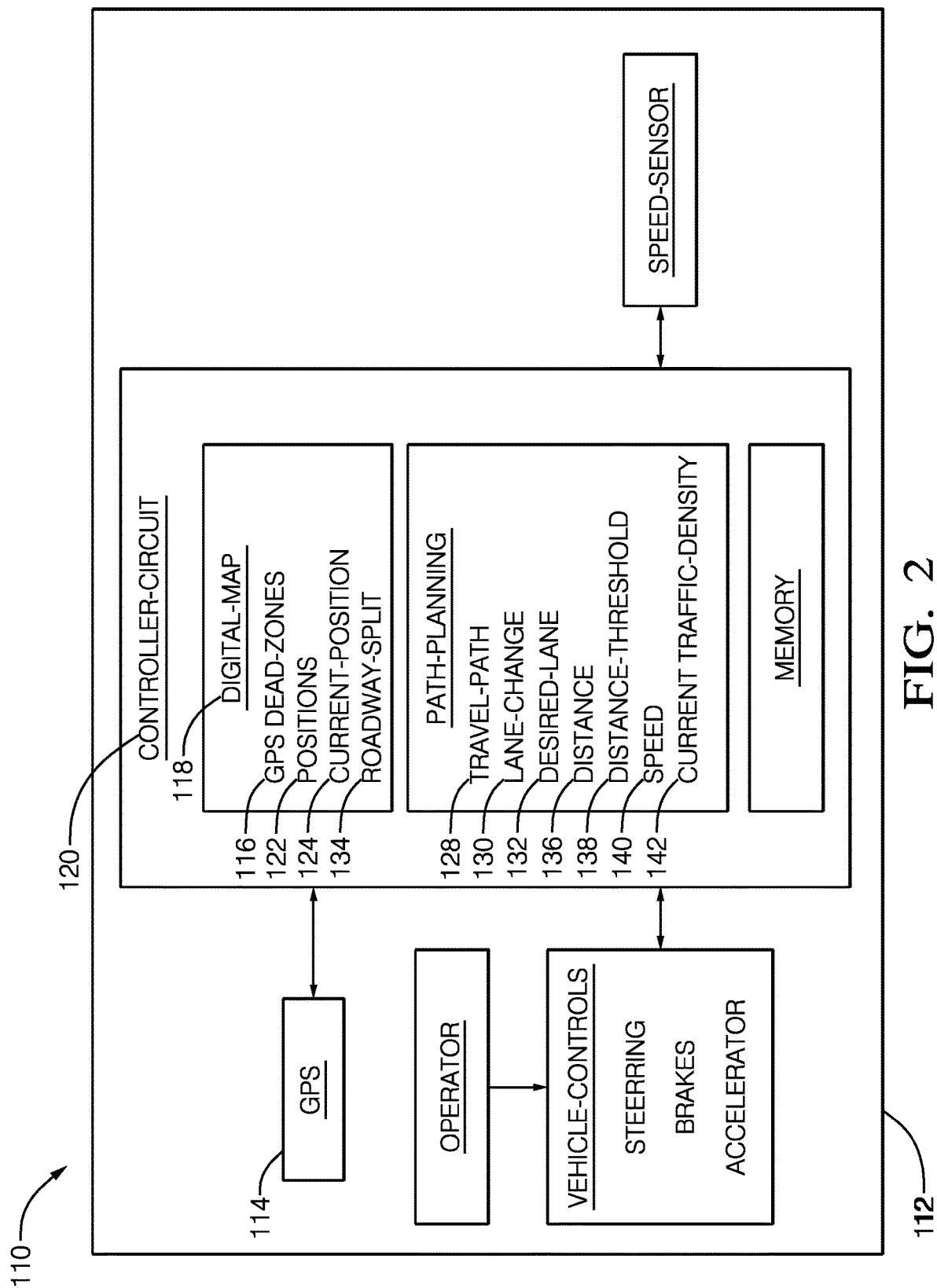
FIG. 2 is an illustration of a navigation system in accordance with another embodiment.

FIG. 2 is an example of another embodiment of a navigation system 110, hereafter referred to as the system 110, installed on a host-vehicle 112. The system 110 includes a digital-map 118 that includes a record of global-positioning-system dead-zones 116 (GPS-dead-zones 116). As will be described in more detail below, the system 110 is an improvement over prior navigation systems because the system 110 identifies GPS-dead-zones 116 and executes path-planning decisions based on positions 122 of the GPS-dead-zones 116. The GPS-dead-zones 116 may be caused by tunnels, overpasses, or a "canyon effect" of buildings. It will be appreciated that navigating with global-positioning-system equipment is not effective in GPS-dead-zones 116, and that any proactive driving maneuver conducted outside of the GPS-dead-zone 116 may be beneficial to the safety of the host-vehicle 112 and other traffic on the roadway 126.

The system 110 includes a global-positioning-system receiver 114 (GPS 114) that indicates a current-position 124 of the host-vehicle 112 on the digital-map 118. In the example illustrated in FIG. 2, the GPS 114 is mechanically coupled to the host-vehicle 112. The GPS 114 may be any of the known GPS 114 used in automotive applications.

The system 110 also includes one or more controller-circuits 120 in communication with the GPS 114 and the digital-map 118. The one or more controller-circuits 120 may include a processor (not shown) such as a microprocessor or other control circuitry such as analog and/or digital control circuitry including an application specific integrated circuit (ASIC) for processing data as should be evident to those in the art. The one or more controller-circuits 120 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the GPS-dead-zone 116 exists based on signals received by the one or more controller-circuits 120 from the GPS 114 and the digital-map 118, as described herein.

The one or more controller-circuits 120 are configured to steer the host-vehicle 112 in an automated-mode whereby an operator (not specifically shown) of the host-vehicle 112 is little more than a passenger. That is, the operator is not substantively involved with the steering or operation of the accelerator and brakes of the host-vehicle 112. It is contemplated that the host-vehicle 112 may also be operated in a manual-mode where the operator is fully responsible for operating the host-vehicle-controls, or in a partial-mode where control of the host-vehicle 112 is shared by the operator and the one or more controller-circuits 120 of the system 110.

Figure 3:
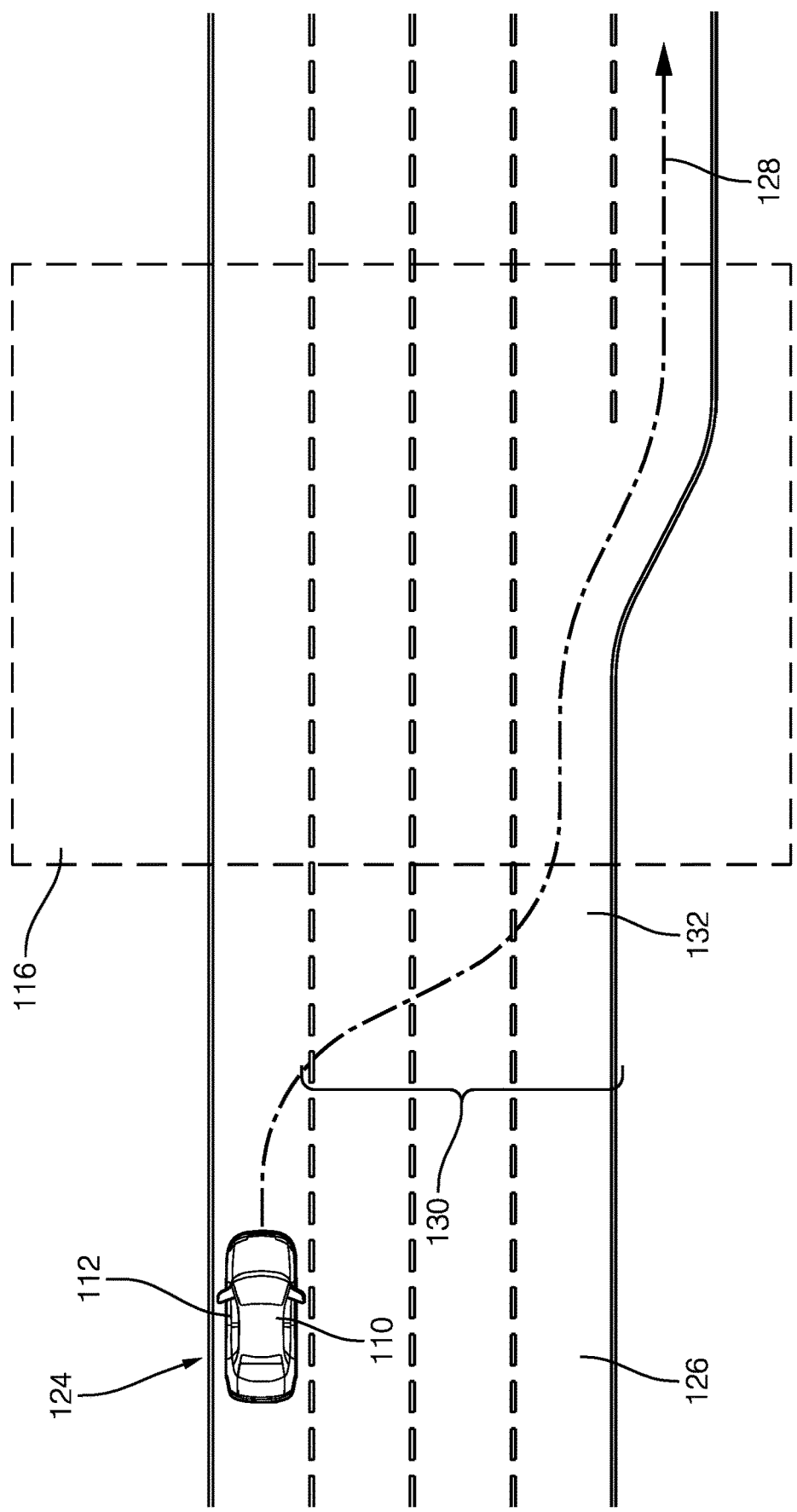
FIG. 3 is an illustration of a traffic scenario in accordance with another embodiment.

FIG. 3 illustrates a traffic scenario where the host-vehicle 112 is traveling on a roadway 126 where a GPS-dead-zone 116 exists on the roadway 126 ahead of the host-vehicle 112 in the direction of travel. A travel-path 128 of host-vehicle 112 includes a lane-change 130 into a desired-lane 132, which is adjacent an exit-lane illustrated at a right-side of the roadway 126. The desired-lane 132 may be any lane determined by the one or more controller-circuits 120 that fulfils the path-planning criteria for navigating the host-vehicle 112 along the roadway 126. The desired-lane 132 may be any lane deemed to be desirable based on the destination and/or path-planning of the host-vehicle 112 and may include a roadway-split 134, such as an exit-ramp, or a "Y" in the roadway 126 ahead. The one or more controller-circuits 120 determine the current-position 124 of the host-vehicle 112 relative to the GPS-dead-zone 116 and determine whether the travel-path 128 for the host-vehicle 112 includes the lane-change 130 to the desired-lane 132. In accordance with the determination by the one or more controller-circuits 120 that the travel-path 128 includes the lane-change 130, and that the host-vehicle 112 is outside of the GPS-dead-zone 116, the one or more controller-circuits 120 steer the host-vehicle 112 to the desired-lane 132 in the automated-mode while the host-vehicle 112 is outside of the GPS-dead-zone 116. In the example illustrated in FIG. 3, the one or more controller-circuits 120 steer the host-vehicle 112 to the desired-lane 132 before the host-vehicle 112 enters the GPS-dead-zone 116. Path-planning used in autonomous vehicles, or used in vehicles with advanced driver assistance systems (ADAS), requires extremely accurate localization information, which is based, at least in part, on accurate global positioning system information. The system 110 recognizes that a GPS-dead-zone 16 is approaching and anticipates that the localization information will likely be degraded in the GPS-dead-zone 16. Thus, deciding to make the lane-change 130 to the desired-lane 132, while the localization information is accurate, is beneficial because it improves the safety of the host-vehicle 12.

Figure 4:
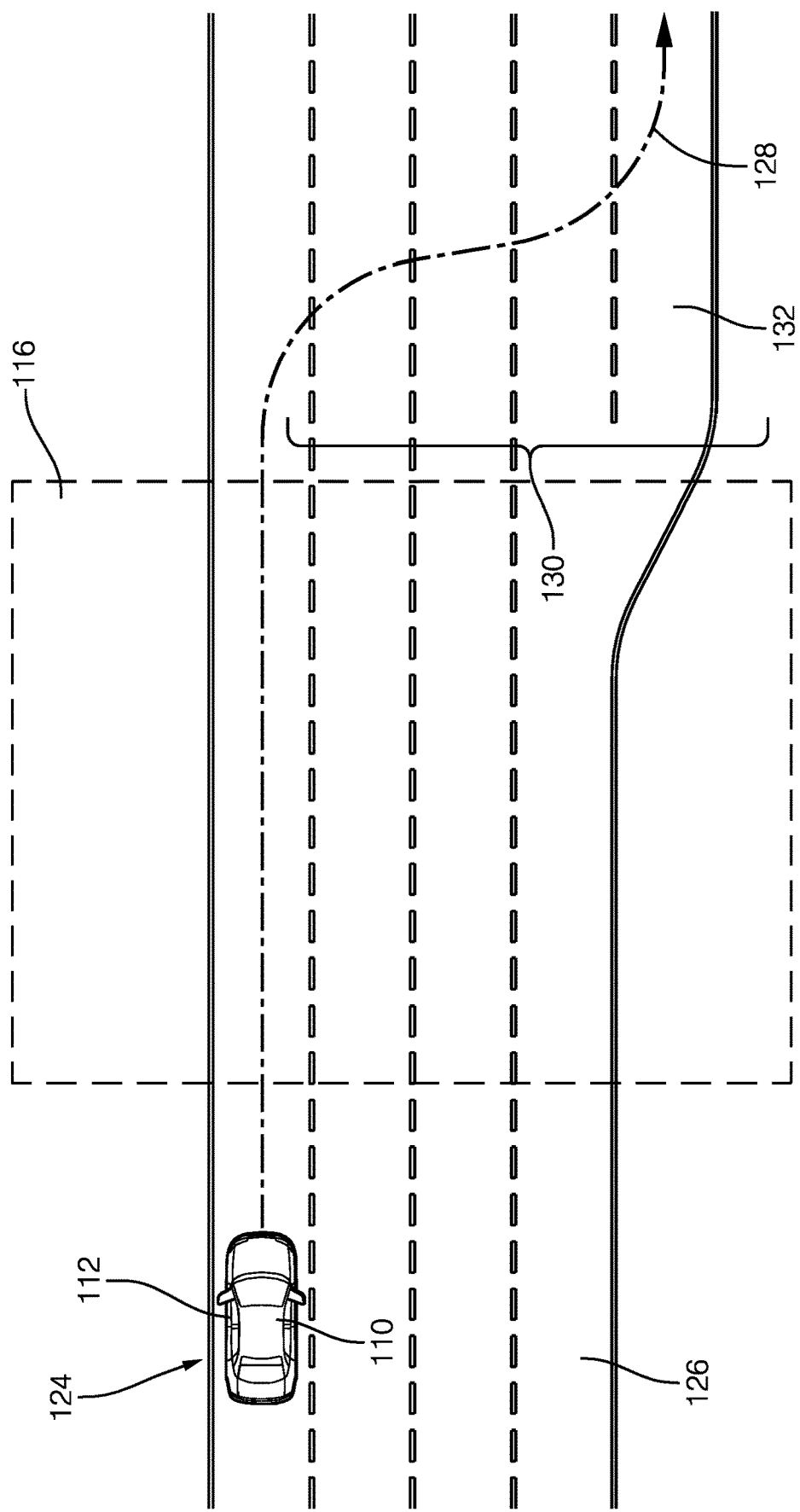
FIG. 4 is an illustration of another traffic scenario in accordance with another embodiment.

FIG. 4 illustrates another traffic scenario with the host-vehicle 112 traveling on the roadway 126 where the GPS-dead-zone 116 exists on the roadway 126 ahead of the host-vehicle 112 in the direction of travel. The travel-path 128 of host-vehicle 112 includes the lane-change 130 into the desired-lane 132, which is an exit-lane illustrated at the right-side of the roadway 126. In the example illustrated in FIG. 4, the one or more controller-circuits 120 steer the host-vehicle 112 to the desired-lane 132 after the host-vehicle 112 exits the GPS-dead-zone 116. Path-planning used in autonomous vehicles, or used in vehicles with advanced driver assistance systems (ADAS), requires extremely accurate localization information, which is based, at least in part, on accurate global positioning system information.

The system 110 recognizes that a GPS-dead-zone 16 is approaching and anticipates that the localization information will likely be degraded in the GPS-dead-zone 16. Thus, deciding to make the lane-change 130 to the desired-lane 132, while the localization information is accurate, is beneficial because it improves the safety of the host-vehicle 12.

Figure 5:
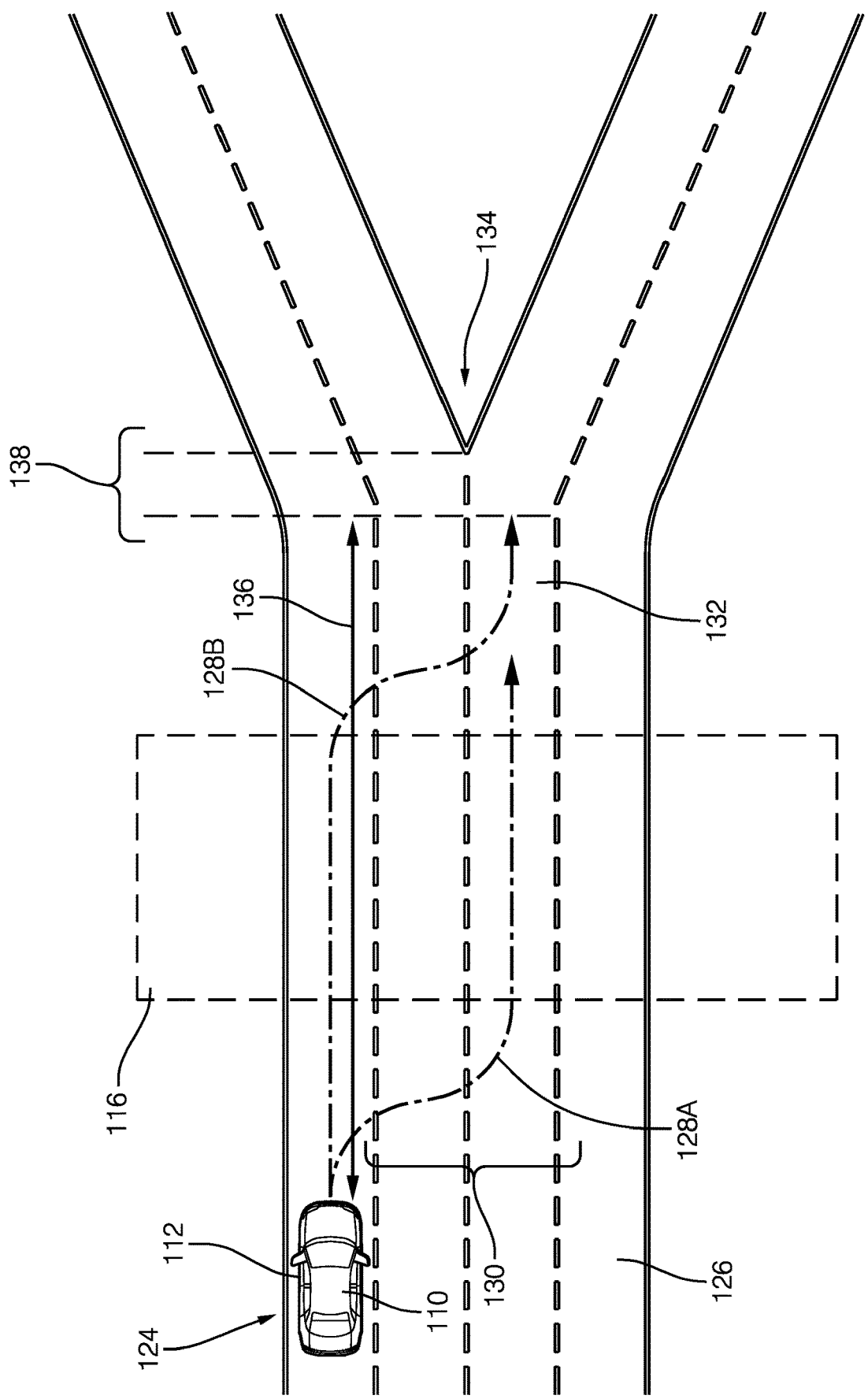
FIG. 5 is an illustration of yet another traffic scenario in accordance with another embodiment.

FIG. 5 illustrates another traffic scenario with the host-vehicle 12 is traveling on the roadway 126 where the GPS-dead-zone 116 exists on the roadway 126 ahead of the host-vehicle 112 in the direction of travel. The travel-path 128 of host-vehicle 112 includes the lane-change 130 into the desired-lane 132 ahead of the roadway-split 134 where the travel-lanes of the roadway 126 diverge. It will be understood that the location of the roadway-split 134 relative to the host-vehicle 112 is identified by the one or more controller-circuits 120 based on the digital-map 118. The one or more controller-circuits 120 determine the lane-change 130 to the desired-lane 132 at a distance 136 greater than a distance-threshold 138 from the roadway-split 134. The one or more controller-circuits 120 may steer the host-vehicle 112 to the desired-lane 132 before the host-vehicle 112 enters the GPS-dead-zone 116 (travel-path 128A) or after the host-vehicle 112 exits the GPS-dead-zone 116 (travel-path 128B), based on other factors that include traffic, road construction, road conditions, and/or the proximity of the roadway-split 134 to the GPS-dead-zone 116. Path-planning used in autonomous vehicles, or used in vehicles with advanced driver assistance systems (ADAS), requires extremely accurate localization information, which is based, at least in part, on accurate global positioning system information. The system 110 recognizes that a GPS-dead-zone 16 is approaching and anticipates that the localization information will likely be degraded in the GPS-dead-zone 16. Thus, deciding to make the lane-change 130 to the desired-lane 132, while the localization information is accurate, is beneficial because it improves the safety of the host-vehicle 12.

The distance-threshold 138 is based on a speed 140 of the host-vehicle 112, and the distance-threshold 138 increases with the increasing speed 140 of the host-vehicle 112 in order to safely execute the lane-change 130. As will be understood, a greater distance is traveled per increased vehicle speed, necessitating a greater distance to potentially complete the same maneuver. In another embodiment the distance-threshold 138 is based on a current traffic-density 142, and the distance-threshold 138 increases with the increasing current traffic-density 142 because it may be more difficult (take more time or a greater distance) to change paths with a greater number of cars in the potential path. In yet another embodiment the distance-threshold 138 is based on both the speed 140 of the host-vehicle 112 and the current traffic-density 142. The distance-threshold 138 may be user defined in accordance with local traffic-laws. The current traffic-density 142 may be determined by any of the known methods, such as a ranging-sensor (not shown), cloud-based traffic reporting, or a camera (not shown) located on the host-vehicle 112 or located on a roadway-infrastructure and in communication with the host-vehicle 112 (not shown). The current traffic-density 142 may also be received by the host-vehicle 112 from a traffic-control-device (not shown) by any of the know wireless communication methods.

Figure 6:
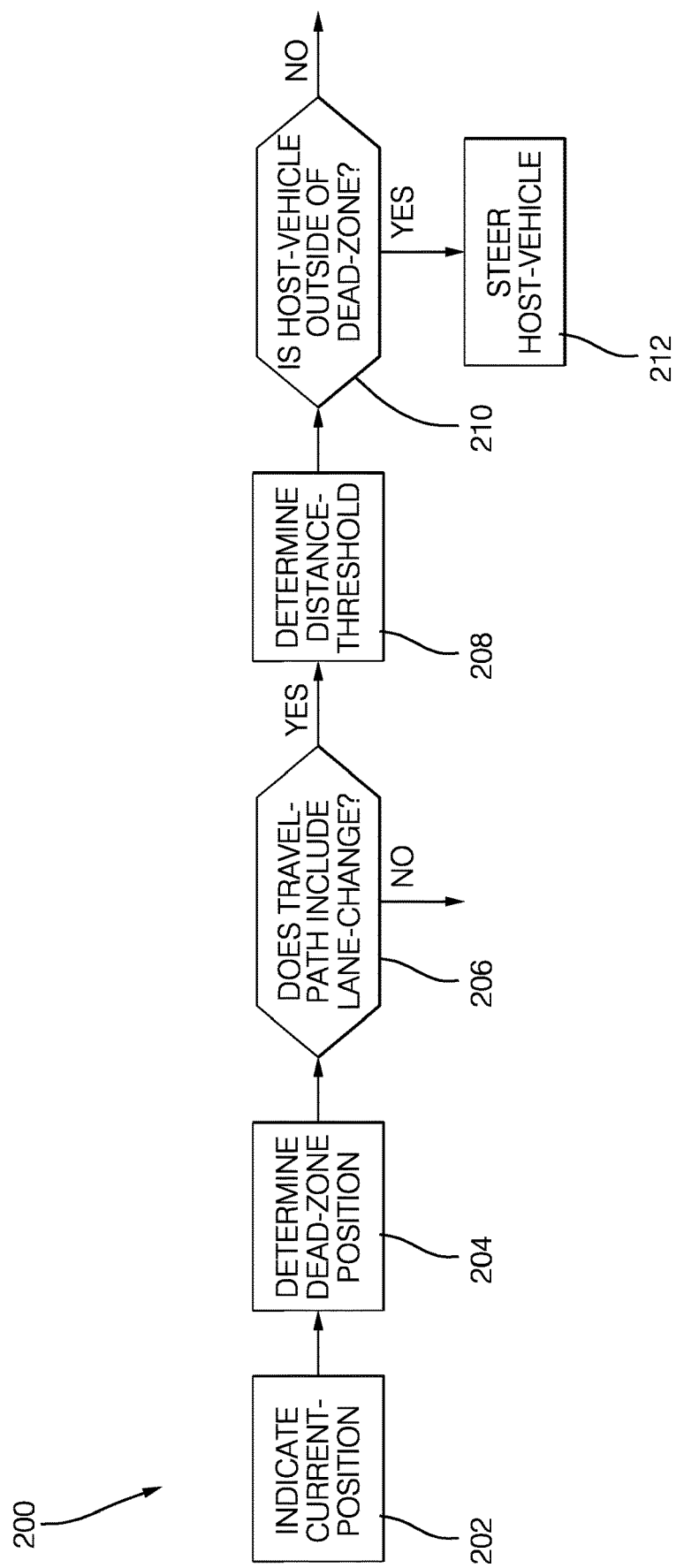
FIG. 6 is an illustration of a method of operating the navigation system of FIG. 2 in accordance with yet another embodiment.

FIG. 6 is a flow chart illustrating another embodiment of a navigation method 200, hereafter referred to as the method 200, for operating a navigation system 110, hereafter referred to as the system 110.

Step 202, INDICATE CURRENT-POSITION, includes indicating, with a global-positioning-system receiver 114 (GPS 114), a current-position 124 of a host-vehicle 112 on a digital-map 118 that includes a record of GPS-dead-zones 116 as described above and illustrated in FIG. 2.

Step 204, DETERMINE DEAD-ZONE POSITION, includes determining, with one or more controller-circuits 120 in communication with the GPS 114 and the digital-map 118, the current-position 124 of the host-vehicle 112 relative to the GPS-dead-zones 116 as described above and illustrated in FIGS. 3-5.

Step 206, DETERMINE LANE-CHANGE, includes determining, with the one or more controller-circuits 120, whether a travel-path 128 for the host-vehicle 112 includes a lane-change 130 to a desired-lane 132 as illustrated in FIGS. 3-5. The desired-lane 132 may be any lane deemed to be desirable based on the destination and/or path-planning of the host-vehicle 112 and may include a roadway-split 134, such as an exit-ramp, or a "Y" in the roadway 126 ahead, as described above.

Step 208, DETERMINE DISTANCE-THRESHOLD, includes determining, with the one or more controller-circuits 120, a distance-threshold 138 from a roadway-split 134 as illustrated in FIG. 5. The distance-threshold 138 is based on a speed 140 of the host-vehicle 112, and/or a current traffic-density 142 as described above. The one or more controller-circuits 120 determine the lane-change 130 to the desired-lane 132 at a distance 136 greater than the distance-threshold 138 from the roadway-split 134 as described above.

Step 210, DETERMINE READINESS TO CHANGE LANES, in accordance with the determination by the one or more controller-circuits 120 that the travel-path 128 includes the lane-change 130 and that the host-vehicle 112 is outside of the GPS-dead-zone 116 proceed to STEP 212.

Step 212, STEER HOST-VEHICLE, includes steering the host-vehicle 112 in an automated-mode, with the one or more controller-circuits 120, to the desired-lane 132. The one or more controller-circuits 120 steer the host-vehicle 112 into the desired-lane 132 before the host-vehicle 112 enters the GPS-dead-zone 116 or after the host-vehicle 112 exits the GPS-dead-zone 116, as described above.

Accordingly, navigation systems 10 and 110, and a method 200 of operating the navigation system 110 is provided. The system 10 is beneficial for path-planning and enables the system 10 to identify a future change of travel-lanes to be executed outside of the GPS-dead-zone 16. Additionally, the system 110 is beneficial because the system 110 identifies GPS-dead-zones 116 and executes path-planning decisions based on positions 122 of the GPS-dead-zones 116. It will be appreciated that any proactive driving maneuver conducted outside of the GPS-dead-zone 116 is beneficial to the safety of the host-vehicle 112 and other traffic on the roadway 126.

It will be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. Furthermore, the terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Additionally, directional terms such as upper, lower, etc. do not denote any particular orientation, but rather the terms upper, lower, etc. are used to distinguish one element from another and locational establish a relationship between the various elements.

I claim:
1. A navigation system comprising:
a digital map that includes a record of global positioning system dead zones;
a global positioning system receiver;
one or more controller circuits in communication with the global positioning system receiver and the digital map, said one or more controller circuits configured to:
determine a current position of a host vehicle relative to a global positioning system dead zone;
determine whether a travel path for the host vehicle includes a lane change to a desired lane; and
in accordance with a determination that the travel path includes the lane change and a determination that the current position of the host vehicle is outside of the global positioning system dead zone, steer the host vehicle to the desired lane.
2. The navigation system in accordance with claim 1, wherein the one or more controller circuits are further configured to:
determine that the travel path includes the lane change at a distance greater than a distance threshold from a roadway split.

3. The navigation system in accordance with claim 2, wherein the distance threshold is based on a speed of the host vehicle.

4. The navigation system in accordance with claim 2, wherein the distance threshold is based on a current traffic density.

5. The navigation system in accordance with claim 2, wherein the distance threshold is based on a speed of the host vehicle and a current traffic density.

6. The navigation system in accordance with claim 1, wherein the one or more controller circuits is further configured to:
   steer the host vehicle to the desired lane before the host vehicle enters the global positioning system dead zone.

7. The navigation system in accordance with claim 1, wherein the one or more controller circuits is further configured to:
   steer the host vehicle to the desired lane after the host vehicle exits the global positioning system dead zone.

8. A method comprising:
   indicating a current position of a host vehicle on a digital map that includes a record of global positioning system dead zones;
   determining, with one or more controller circuits of the host vehicle in communication with a global positioning system receiver of the host vehicle the current position of the host vehicle relative to the global positioning system dead zones;
   determining, with the one or more controller circuits, whether a travel path for the host vehicle includes a lane change to a desired lane; and
   in accordance with a determination that the travel path includes the lane change and a determination that the host vehicle is outside of the global positioning system dead zone, steering, by the one or more controller circuits, the host vehicle to the desired lane.

9. The method in accordance with claim 8, further comprising:
   determining, with the one or more controller circuits, the lane change to the desired lane at a distance greater than a distance threshold from a roadway split.

10. The method in accordance with claim 9, wherein the distance threshold is based on a speed of the host vehicle.

11. The method in accordance with claim 9, wherein the distance threshold is based on a current traffic density.

12. The method in accordance with claim 9, wherein the distance threshold is based on a speed of the host vehicle and a current traffic density.

13. The method in accordance with claim 8, further comprising:
   steering, with the one or more controller circuits, the host vehicle to the desired lane before the host vehicle enters the global positioning system dead zone.

14. The method in accordance with claim 8, further comprising:
   steering, with the one or more controller circuits, the host vehicle to the desired lane after the host vehicle exits the global positioning system dead zone.

15. A system comprising a navigation system, wherein the navigation system is configured to:
   indicate a current position of a host vehicle on a digital map that includes a record of global positioning system dead zones;
   determine, with a global positioning system receiver of the host vehicle, the current position of the host vehicle relative to the global positioning system dead zones;
   determine whether a travel path for the host vehicle includes a lane change to a desired lane; and
   in accordance with a determination that the travel path includes the lane change and a determination that the host vehicle is outside of the global positioning system dead zone, steer the host vehicle to the desired lane.

16. The system of claim 15, further comprising the global positioning system receiver of the host vehicle.

17. The system of claim 15, wherein the system further comprises a memory that maintains the digital map.

18. The system of claim 17, further comprising the global positioning system receiver of the host vehicle.

19. The system of claim 15, wherein the global positioning system receiver is mechanically coupled to the host vehicle.

20. The system of claim 15, wherein the digital map is maintained in a memory external to the system.

* * * * *